Aug. 26, 1969    R. W. SEABURY, JR    3,464,014
ELECTRICAL INSTRUMENT HAVING A ROTATABLE MEMBER SUPPORTED
BY A CATENARY SUSPENSION SYSTEM
Filed July 2, 1965    4 Sheets-Sheet 4

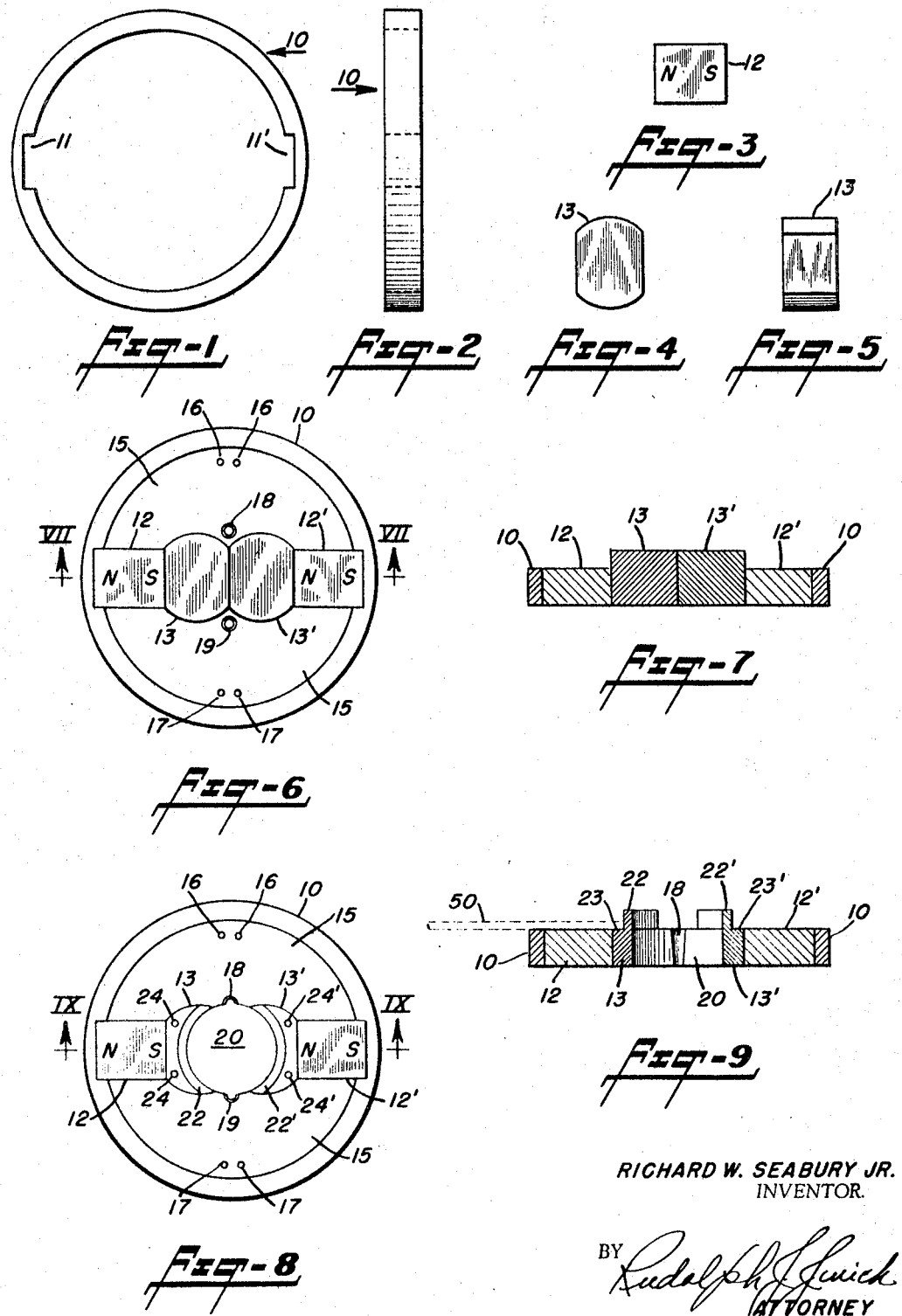

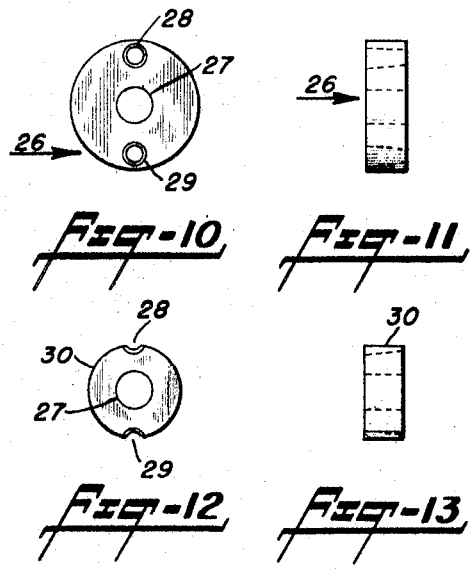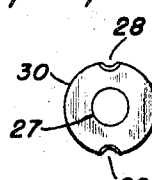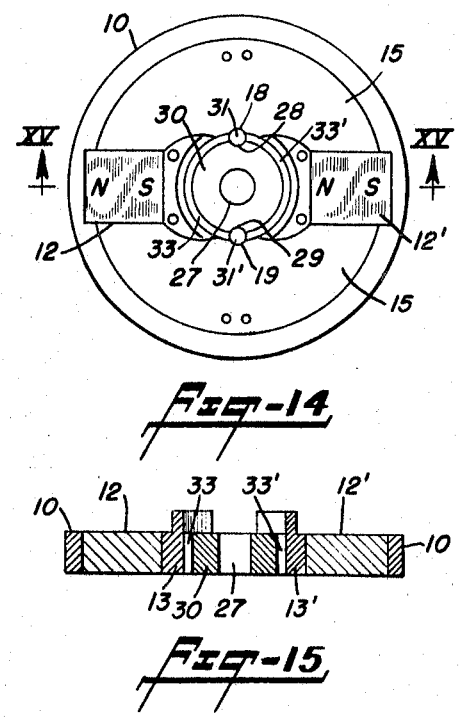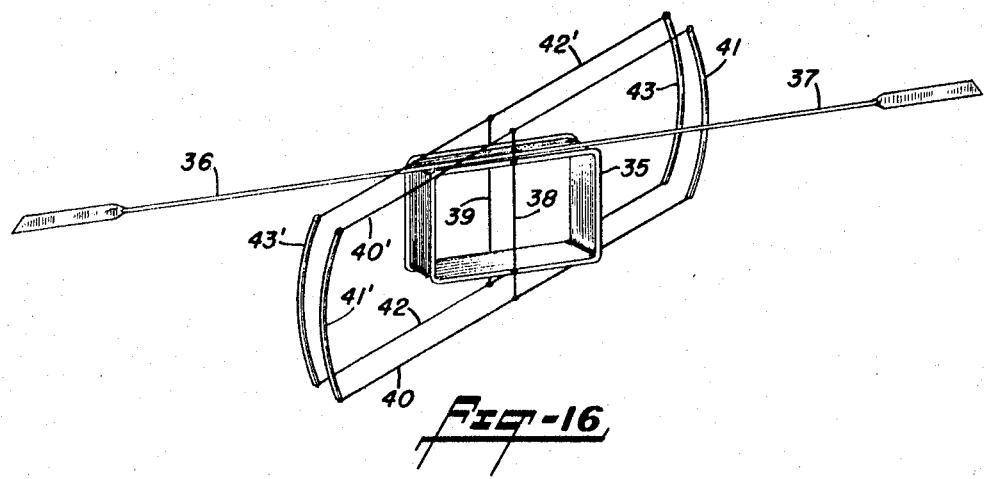

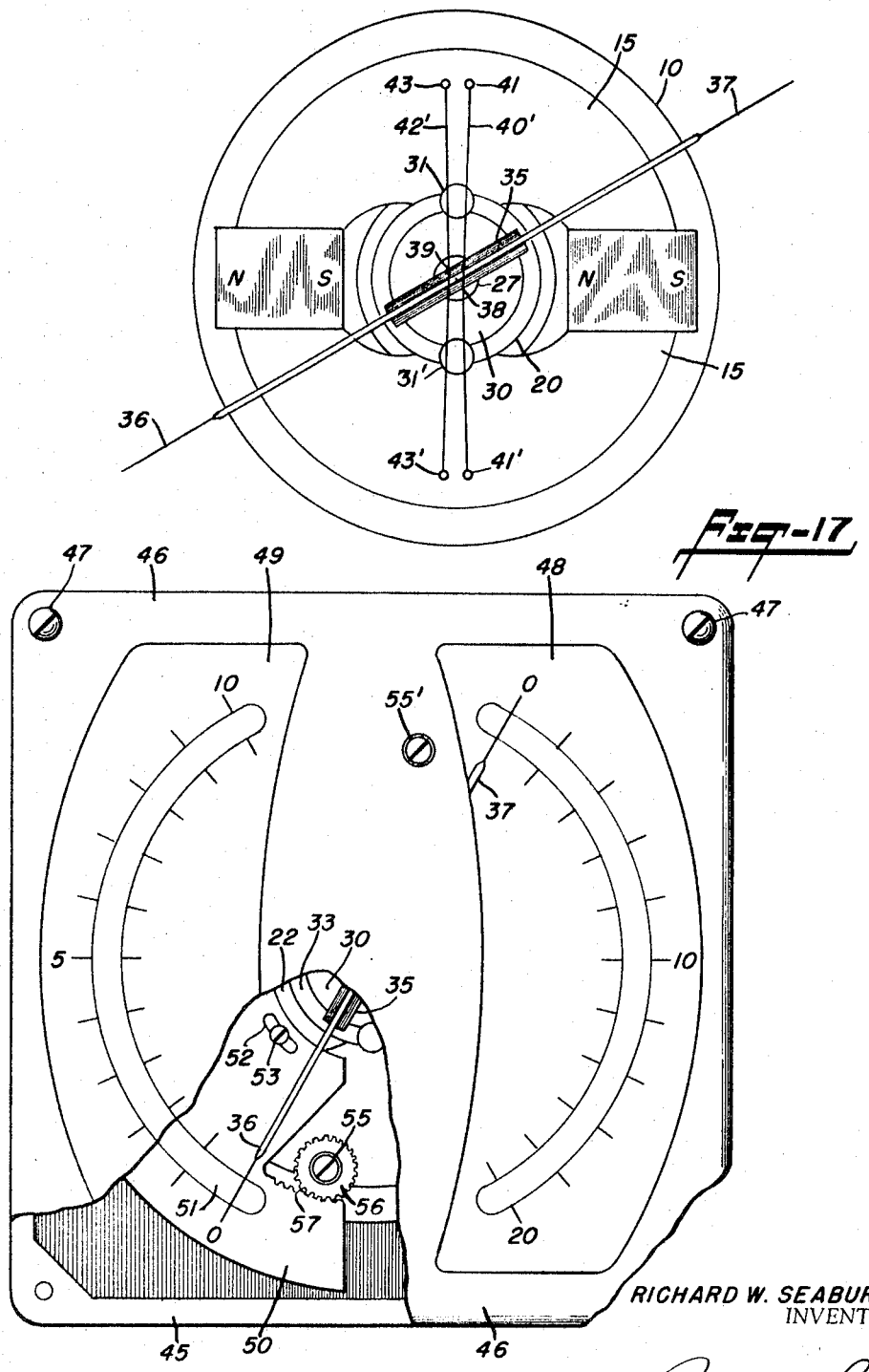

RICHARD W. SEABURY JR.
INVENTOR.

BY
ATTORNEY

United States Patent Office 3,464,014
Patented Aug. 26, 1969

3,464,014
ELECTRICAL INSTRUMENT HAVING A ROTATABLE MEMBER SUPPORTED BY A CATENARY SUSPENSION SYSTEM
Richard W. Seabury, Jr., Towaco, N.J., assignor to Radio Frequency Laboratories, Inc., Boonton, N.J., a corporation of New Jersey
Filed July 2, 1965, Ser. No. 469,098
Int. Cl. G01r 1/00, 1/16, 1/20
U.S. Cl. 324—154     7 Claims

ABSTRACT OF THE DISCLOSURE

The rotatable member of an electrical instrument is supported for rotation about a predetermined axis solely by two sets of catenary wire suspensions extending normal to the said axis, said sets of wire suspensions lying in parallel planes spaced to either side of said axis. A pair of transverse wires are secured to the rotatable member, each such transverse wire having ends secured to an associate set of the wire suspensions subtantially at the mid point thereof.

---

This invention relates to electrical measuring instruments and more particularly to an instrument of novel construction affording manufacturing economy, high sensitivity, high accuracy of measurement and good readability.

The invention will be described specifically with reference to a permanent magnet-movable coil instrument but it will be apparent that the inventive features are adaptable for use in the manufacture of other electrical instruments of the general class wherein the measurement of an electrical quantity is ecected by an electromagnetic reaction between two members, one of which is movable relative to the other.

Electrical measuring instruments having a movable coil carrying axially aligned pivots, rotatable within jewels, are well known. Such instruments have an inherent frictional torque which effects the measuring accuracy particularly in instruments having a high sensitivity. Further, instruments of this class are susceptable to changes in accuracy of indication when subject to mechanical shock.

In instruments for measurements requiring high sensitivity and high accuracy, the movable coil is suspended by axially-aligned filaments. However, when the filaments are relatively long, the instrument must be leveled accurately to maintain the axis of the coil in vertical position and, further, the instrument requires protection against mechanical shocks. In a modification of such filar coil suspension arrangement, the filaments are relatively short and maintained under considerable axial tension. This imposes various problems upon the construction and assembly of the instrument. Also, the filaments are flat ribbons, drawn from an alloy wire, which results in unbalanced working stresses, such as plate area distortion and edge-drawn stresses which initially and/or over a period of time affects the rotational characteristics of the movable coil. Further, even in this type of construction referred to generally as taut band instruments, it is necessary to incorporate a suitable spring system to afford limited axial displacement of the movable coil, thereby to prevent a rupture or permanent deformation of the filaments upon the application of mechanical shock axially of the coil rotational axis.

A movable coil suspension made in accordance with this invention, utilizes a catenary wire suspension system which overcomes the shortcomings of prior suspension type arrangements and results in an instrument having a high sensitivity and accuracy as well as other highly desirable advantages.

In the case of permanent magnet, movable coil instruments, it is highly desirable to have precise concentricity between the magnetic gap, within which the movable coil rotates, and the movable coil assembly including its suspension system. In prior instrument constructions, this requirement has been met by providing costly adjustable members by means of which variations in the production of the components could be compensated for after the assembly of the instrument. In accordance with this invention, the components forming the magnetic structure of the instrument are formed into a permanent, unitary assembly, after which the critical portions of the system are formed by machining operations. This results in a permanent assembly thereby eliminating the need for subsequent adjustments of the individual components in the completion of the instrument.

An object of this invention is the provision of an electrical instrument of novel construction.

An object of this invention is the provision of an electrical instrument having a minimum number of components constructed and arranged to provide symmetry of the critical components and the closest possible coupling of the planes of the torque forces.

An object of this invention is the provision of an electrical measuring instrument wherein the movable system is supported for rotation by a catenary wire suspension affording spring-resisted movement of the system in all planes and a uniform mechanical return torque.

An object of this invention is the provision of an electrical measuring instrument having a movable system and a magnetic structure, which instrument is constructed and arranged to provide absolute and permanent symmetry between the co-acting portions of the magnetic structure and the movable system.

An object of this invention is the provision of an electrical measuring instrument of high sensitivity and accuracy, which instrument is relatively thin, has a large scale area and wherein the scale is adjustable relative to the movable system for the purpose of setting the zero reference point of the instrument.

An object of this invention is the provision of a permanent magnet, movable coil instrument wherein the components forming the magnetic field structure are permanently secured in fixed position, and wherein the movable coil is supported for rotation by a catenary wire suspension system.

These and other objects and advantages of the invention will become apparent from the following description when taken with the accompanying drawings.

In the drawings wherein like reference characters refer to like parts in the several views:

FIGURE 1 is a top plan view of the soft-iron yoke for an instrument made in accordance with this invention;

FIGURE 2 is a side elevational view thereof;

FIGURE 3 is a top plan view of one of the permanent magnets;

FIGURE 4 is a top plan view of one of the soft-iron piece members;

FIGURE 5 is a side elevational view thereof;

FIGURE 6 is a top plan view showing the assembly comprising the yoke, two permanent magnets and two pole piece members;

FIGURE 7 is a central, cross-sectional view taken along the line VII—VII of FIGURE 6;

FIGURE 8 is similar to FIGURE 6 but showing the central hole bored in the pole piece members and the formation of the arcuate collars which serve to position the instrument scale plates;

FIGURE 9 is a central, cross-sectional view taken along the line IX—IX of FIGURE 8;

FIGURE 10 is a top plan view of the cylindrical soft-iron member for making the core of the magnetic structure;

FIGURE 11 is a side elevational view thereof;

FIGURE 12 is a top plan view of the finished soft-iron core;

FIGURE 13 is a side elevational view thereof;

FIGURE 14 is a top plan view showing the soft-iron core secured in position on a magnetic structure to form a precise air gap for the instrument movable coil;

FIGURE 15 is a central, cross-sectional view taken along the line XV—XV of FIGURE 14;

FIGURE 16 is an enlarged, isometric view showing the movable coil, carrying a double pointer, and the catenary wire suspension system made in accordance with this invention;

FIGURE 17 is a top plan view showing the movable coil and the suspension system assembled to the magnetic structure;

FIGURE 18 is a top plan view of the completed instrument with a portion of the cover and window broken away to show the arrangement for setting the zero scale mark in alignment with the zero position of the pointer.

Figure 19:
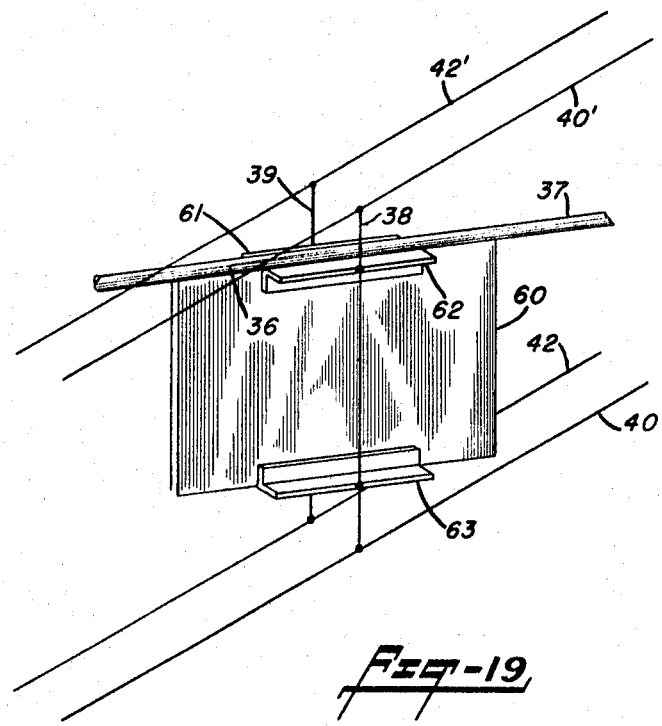
FIGURE 19 is a fragmentary isometric view, similar to FIGURE 16 but showing a soft-iron vane as the movable member.

Referring now to the drawings, the yoke for a permanent magnet, movable coil instrument, made in accordance with this invention, comprises a soft-iron ring 10, as shown in the top plan and side elevational views of FIGURES 1 and 2, respectively. Diametrically-opposed grooves 11, 11' are formed in the inner wall of the ring. It is here pointed out that the ring 10 can be a solid section cut from a hollow cylinder and the grooves formed by a machining operation or, alternatively, the ring may be built up of punched laminae.

One of the permanent magnets 12 is shown in FIGURE 3, said magnet having parallel end faces constituting the polar surfaces. The magnet has a rectangular cross-section such that an end portion thereof fits snugly into one of the grooves of the ring 10. One of the soft-iron pole piece members 13 is shown in FIGURES 4 and 5, FIGURE 4 being a top plan view and FIGURE 5 being a side elevational view.

The assembly of the cylindrical yoke 10, the two permanent magnets 12, 12' and the two pole piece members 13, 13' is shown in top plan view in FIGURE 6. The dimensions of the magnets and pole piece members are such that these members must be force-fitted into the illustrated position. Such assembly is performed on a flat plate, whereby the bottom surfaces of the magnets and pole piece members lie flush with the bottom end surface of the yoke, as shown in FIGURE 7, which is a cross-sectional view taken along the line VII—VII of FIGURE 6. It will be noted that in this assembly the upper surfaces of the pole piece members 13, 13' extend beyond the upper surfaces of the magnets 12, 12', while the latter surfaces are flush with the upper end surface of the yoke 10.

With the described assembly supported on a flat plate, the space between the yoke and the magnets and pole pieces is filled with a suitable molding or casting compound 15. Any suitable compound may be used for this purpose, the important requirements being that the compound must be non-magnetic, non-conducting, remain dimensionally stable during and after setting and provide good adhesion to the surface of the metal parts. When set, the surfaces of the compound will be flush with the corresponding end surfaces of the yoke. The components, described to this point, now constitute a rigid, unitary structure, with all of the components permanently secured together. Consequently, no shifting of the components can occur during subsequent machining operations.

Now, two, accurately-positioned sets of holes 16 and 17 are drilled through the compound 15, which holes accommodate the supports for the movable coil suspension system, as will be described in detail hereinbelow. Also, the two holes 18 and 19 are drilled through the compound, which holes are then reamed to provide tapered holes having a maximum diameter at the upper surface of the compound, as viewed in FIGURE 6.

The assembly now is placed in a suitable fixture and a central hole 20 is bored through the two pole pieces 13, 13' as shown in the top plan view of FIGURE 8. The diameter of this hole, as well as the spacing between the holes 18 and 19 (see FIGURE 6), are determined by the size of the movable coil of the particular instrument. In any event, the central hole 20, see FIGURE 8, intersects the two tapered holes 18 and 19. With the same machine set-up, portions of the upper end surfaces of the pole piece members 13, 13' are turned down to be flush with the contiguous surfaces of the magnets 12, 12', thereby forming the arcuate collars 22, 22' extending from shoulder portions 23, 23', see, also, FIGURE 9, which is cross-sectional view taken along the line IX—IX of FIGURE 8. Two threaded holes 24 are now formed in the collar portion 23 of the pole piece member 13, see FIGURE 8, and similar threaded holes 24' are formed in the collar portion of the other pole piece member. It will be apparent that in the assembly made and machined, as described, precise concentricity is achieved between the central hole 20, the collars 22, 22' and the yoke 10. This inherent precision, permanently built into the magnetic structure during manufacture, obviates the need to provide for additional mechanical or magnetic adjusting arrangements as heretofore required to compensate for manufacturing tolerances of the individual components.

The magnetic structure of the instrument, as described to this point and shown in FIGURES 8 and 9, is complete except for the soft-iron core. Such core is made from a cylindrical blank of soft-iron identified by the numeral 26 in FIGURES 10 and 11, FIGURE 10 being a top plan view and FIGURE 11 being a side elevational view. A central hole 27 is drilled through the blank, said hole having a diameter determined by the width of the particular movable coil as will become apparent as the description proceeds. Two, diametrically spaced holes 28 and 29 also are drilled through the blank, and these holes are reamed to provide tapered holes corresponding precisely in size and shape to the holes 18 and 19 shown in FIGURES 6 and 8. The blank now is machined to a predetermined finished diameter to form the core 30, as shown in the corresponding FIGURES 12 and 13, it being noted that only portions of the walls defining the holes 28 and 29 remain. Such core 30 is insertable into the central hole of the previously described magnetic structure, as shown in FIGURE 14, and is secured in position by two, Phosphor bronze, tapered pins 31 and 31' driven into the matching portions of the tapered holes 18 and 28 and the tapered holes 19 and 29. The core 30 is concentric with the central hole of the magnetic structure (see hole 20 in FIGURE 8) thereby forming two, precise, arcuate air gaps 33, 33' of constant radial width, see also FIGURE 15, which is a cross-sectional view taken along the line XV—XV of FIGURE 14.

Reference now is made to FIGURE 16, which is an enlarged isometric view showing the wire wound movable coil 35, of square or rectangular shape and having secured thereto the dual, knife edge pointers 36 and 37. Secured to opposite side edges of the movable coil are a pair of vertical wires 38 and 39 made of steel, or byrillium alloy. These wires are secured to opposite side edges of the movable coil along a vertical plane which bisects the coil. The ends of the wire 38 are welded to the midpoints of the horizontal wires 40, 40', the latter having ends welded to the relatively heavy support wires 41, 41'. Similarly, the vertical wire 39 has its ends welded to the midpoints of the horizontal wires 42, 42', the latter having ends welded to the support wires 43, 43'. The support wires, preferably made of copper-clad piano wire, maintain the horizontal wires 40, 40' and 42, 42' under tension and such wires, in turn, maintain tension on the vertical, or transverse, wires 38 and 39.

The described assembly constitutes a catenary wire suspension for the movable coil. The geometry of the suspension allows spring-resisted movement in all planes of dimensional change due to rotation of the movable coil. Thus, movable coil rotation is about an axis spaced midway between the vertical wires 38 and 39 and lying in the plane of the said wires. Only round, drawn wires are used in the suspension system, thereby eliminating unbalanced working stresses, such as, plate area distortion and non-uniform edge stresses, which are inherent in drawn flat ribbons. The catenary suspension system provides a uniform torque, of relatively small magnitude for opposing coil rotation. However, such torque is effective to return the movable coil to its initial position, that is, to a position wherein the stresses of the system are in a condition of static balance. While the terms vertical and horizontal have been applied to the wires of the suspension system for purposes of description, it will be apparent that such reference terms apply when the pointers are movable in a horizontal plane, as when the instrument rests upon a table. The instrument may be mounted on a panel, in which case the movable coil rotates about a horizontal axis with the pointers movable in a vertical plane, without in any way losing the advantages of the described suspension system. Also, dual pointers are shown in FIGURE 16, but one of the pointers can be omitted and the system dynamically balanced by means of a weight, in accordance with conventional practice in the instrument art.

In the assembled instrument, as will be described below, the support wires 41, 41' 43 and 43' are electrically insulated from each other. Thus, with the ends of the coil 45 connected to the vertical wires 38 and 39, two of the support wires, say the wires 41 and 43, are connected to suitable terminals, carried by the instrument case, whereby the coil can be connected to an external circuit.

The assembly shown in FIGURE 16 is symmetrical with respect to the rotational axis of the movable coil, such axis being spaced midway between the vertical wires 38 and 39 and lying in the plane of these wires, and such plane bisecting the movable coil. This establishes a given zero position for the coil and a given zero mechanical torque value at or about such zero coil position. If, now, the vertical wire 38 is secured to the movable coil at vertically-aligned points spaced somewhat to the right of the illustrated position, the coil rotational axis will also be shifted to the right, since such axis always lies in the plane containing the vertical wires. This changes the zero position of the movable coil and also the zero mechanical torque value at or about such coil position. Hence, the zero position and deflection characteristics of the movable system can be controlled by selecting the points at which the coil is secured to the vertical wires.

Reference now is made to FIGURE 17, which is a top plan view showing the complete instrument mechanism, that is, the movable system and the magnetic structure. The mechanism is assembled as follows. The support wires 41, 41', and 43, 43' are forced through the holes provided for this purpose in the casting compound 15. The core 30 is inserted into the movable coil 35 and these two members are inserted into the central hole 20 of the magnetic structure. Next, the tapered pins 31 and 31' are driven into place thereby mechanically locking the core in position. The vertical suspension wires 38 and 39, having previously been secured to the upper side walls of the movable coil, are passed through the hole 27 formed in the core 30, and then secured to the opposite side walls of the coil, said coil being provided with markings identifying the points of attachment of these wires thereto. Now, the wires 40' and 42' are welded to the associated support wires. During the operation, one set of the support wires such as, for example, wires 41 and 43, are flexed toward the associated support wires by means of a suitable fixture, whereby release of the flexed wires, after the wires 40' and 42' have been welded thereto, will place the latter wires under a predetermined amount of tension. The corresponding horizontal wires 40 and 42 are similarly welded to the other ends of the support wires.

The vertical wires 38 and 39, which initially are of excess length, are welded to the horizontal wires after which the excess portions are cut off. During the assembly of the mechanism, suitable jigs and fixtures are employed to retain the parts in proper relative positions. All of the mechanical connections are glued or welded in dead center positions as optically observed during the assembly operation. As each component part is added to the assembly, it is positively and permanently secured in proper operative position. Thus, when the assembly has been completed, no further mechanical adjustments or compensation is required and the mechanism is ready for electrical calibration and insertion into a suitable case.

It may here be pointed out that the tapered pins 31 and 31' may serve as mechanical stops defining the limits of rotation of the movable coil.

FIGURE 18 is a top plan view showing the completed instrument including a generally rectangular case 45 having a cover 46 secured thereto by suitable screws 47. The cover is provided with a pair of openings which are closed by transparent windows 48 and 49 overlying the two scale plates. A portion of the cover and the window 49 are broken away to show the underlying scale plate 50 and portions of the movable coil 35, core 30, arcuate air gap 33 and associate collar 22, the latter being formed in the associate pole piece, as described hereinabove with reference to FIGURES 8 and 9. The scale plate 50 is a brass plate, having an arcuate mirror 51 and provided with suitable scale graduations and markings. This scale plate has an arcuate center portion abutting the collar 22 and has two, spaced, arcuate slots formed therein, which slots are concentric with the collar, only one such slot 52 being visible in FIGURE 18. A fastening screw 53 passes through the slot 52 and is threaded into the hole provided for this purpose in the underlying shoulder portion of the pole piece, specifically, the lower threaded hole 24 in the pole piece number 13 shown in FIGURE 8. A similar fastening screw passes through the other scale plate slot and is threaded into the upper hole 24 shown in FIGURE 8. The scale plate 50, shown in dotted lines in FIGURE 9, rests upon the flush surfaces of the yoke 10, magnet 12' and the shoulder portion 23 of the pole piece 13. A spring washer is associated with each of the scale plate fastening screws, whereby the scale plate is secured in fixed position relative to the magnetic structure but yet may be rotated about the collar 22, which collar is concentric with respect to the rotational axis of the movable coil.

Rotation of the scale plate 50, when necessary to align the zero mark on the scale with zero position of the pointer 36, is effected by means of a screw 55 carried by the cover 46. This zero-adjusting screw carries a fine tooth gear 56 which meshes with corresponding teeth 57 formed in the edge of the scale plate 50 and lying on an arc concentric with the collar 22, a portion of the scale plate being cut out to clear the gear 55. The other scale plate is similarly constructed and arranged and is rotatable by means of a similar zero-adjusting screw 55'.

Although the two pointers are secured to a single movable coil, suitable external resistors may be selectively connected in series and/or shunt to the movable coil, whereby the two scales can be calibrated in terms of different ranges of the same quantity.

A magnetic structure and movable system made as described herein results in a relatively thin but highly sensitive instrument having a full scale range of 1 micro ampere, has an overall thickness of approximately 1½ inches, and scales having a radius of 4 inches and an arcuate length of 120 angular degrees. The rotation of the separate scales to set the zero positions does not change the normal zero position of the movable coil in the magnetic flux gap, so that the deflection characteristics of the instrument are not changed, thereby maintaining integrity of the original scale calibrations.

The above-described suspension system may be incorporated in an A.C. instrument of the movable vane type. As shown in the fragmentary view of FIGURE 19, a thin soft-iron vane 60 has an upper pair of angle brackets 61 and 62 secured thereto as by rivets or by welding. The upper surfaces of these brackets are substantially coplanar with the upper edge surface of the vane 60, thereby forming a platform to which the dual pointers 36 and 37 are secured. A similar pair of angle brackets are secured to the lower portion of the vane, only the forward bracket 63 being visible in this particular view. The vertical wires 38 and 39 are secured to the edges of the proximate angle brackets along a vertical plane which bisects the vane 60, said vertical wires 38 and 39 having their respective ends connected to the suspension wires 40 and 40' and 42, 42'. Those skilled in this art will understand that in an A.C. instrument the vane 60 is positioned for rotation in a magnetic field established by a magnetic structure which includes field coils having current flowing therethrough. As in the case of the wire wound movable coil, the vane rotates about an axis spaced midway between the vertical wires 38 and 39 and lying in the plane of said wires. In the illustrated assembly, such plane bisects the vane 60. It will be apparent, however, that the vertical wires can be secured to the vane along a vertical plane other than one which bisects the vane. In such case, the movable system can be balanced by means of suitable balance weights, as is conventional in this art.

I claim:
1. An electrical instrument comprising,
   (a) a magnetic structure having an air gap,
   (b) a movable member operatively disposed in the air gap,
   (c) a first pair of supporting members disposed on opposite sides of the air gap and secured in fixed position relative to the magnetic structure, at least one of said members being made of a spring material,
   (d) a second pair of similar supporting members similarly disposed on opposite sides of the air gap, at least one of said members being made of a spring material,
   (e) a first pair of tensioned suspension wires extending along opposite sides of the magnetic structure and secured to the said first pair of supporting members,
   (f) a second pair of tensioned suspension wires extending along opposite sides of the magnetic structure and secured to the said second pair of supporting members, and
   (g) a pair of parallel transverse wires passing through the said air gap and secured to the movable member, one of the transverse wires having ends secured to the mid points of the said first pair of tensioned wires and the other transverse wire having ends secured to the said second pair of tensioned wires, the arrangement being such that the movable member is rotatable about an axis lying in a plane containing the said pair of transverse wires.

2. An electrical instrument comprising,
   (a) a cylindrical soft-iron yoke having diametrically-opposed grooves formed in the inner wall surface,
   (b) a pair of rectangular permanent magnets, each magnet having an end disposed in one of the said grooves,
   (c) soft-iron pole pieces in engagement with the other ends of the magnets,
   (d) a non-magnetic, non-conducting compound securing the magnets and pole pieces in fixed position to the yoke,
   (e) means forming a cylindrical spacing between the said pole pieces,
   (f) a cylindrical soft-iron core concentrically-disposed in the cylindrical spacing and having a surface spaced from the pole pieces thereby to form a pair of arcuate flux gaps,
   (g) a movable coil encircling the said core and having opposed sides passing through the arcuate flux gaps,
   (h) a scale,
   (i) a pointer carried by the movable coil and cooperating with the scale,
   (j) a first pair of spring wires passing through spaced holes formed in the said compound at one side of the core,
   (k) a second pair of spring wires passing through holes formed in the said compound at the opposite side of the core,
   (l) a first pair of parallel, tensioned wires spaced from each end of the core and having ends secured to corresponding ends of the said first and second pairs of spring wires,
   (m) a second pair of parallel, tensioned wires spaced from each end of the core and having ends secured to the other corresponding ends of the said first and second pair of spring wires, and
   (n) a pair of transverse, parallel wires secured to the movable coil and extending through a central hole formed in the core, said transverse wires having corresponding ends secured to the mid points of said first pair of tensioned wires and corresponding ends secured to the mid points of the second pair of tensioned wires.

3. The invention as recited in claim 2, including means forming tapered hole portions in the casting compound, which portions are spaced along a diameter of the yoke; means forming diametrically-opposed, matching tapered hole portions in the surface of the core and presented to the hole portions formed in the compound; and non-magnetic, tapered pins force-fitted into the proximate hole portions thereby securing the core concentrically in the said cylindrical spacing.

4. The invention as recited in claim 2, including a collar formed on one of the pole pieces and concentric with the said core; and means mounting the scale plate for rotation about the said collar.

5. The invention as recited in claim 4, wherein the instrument is enclosed within a case and including cooperating means carried by the case and the scale for manually rotating the scale about the said collar.

6. An electrical instrument comprising,
   (a) a magnetic structure comprising a soft-iron yoke having diametrically-opposed grooves formed in the inner wall; a pair of rectangular permanent magnets each having an end disposed in one of the grooves; a pair of soft-iron pole piece members abutting each other and the other ends of the magnets; and a non-magnetic, non-conducting casting compound filling the space between the yoke and the magnets and pole pieces,
   (b) means forming a central hole through the magnetic structure, which hole is defined by a wall including portions of the pole piece members and portions of the compound,
   (c) an arcuate collar formed on each pole piece member,
   (d) a cylindrical soft-iron core having a central hole extending therethrough,
   (e) means mounting the core concentrically within the said central hole,
   (f) a pair of scale plates carrying calibrated scales, each scale plate having an arcuate side edge portion abutting one of the collars formed on the pole piece members,
   (g) manually-operable means for independently rotating each scale about the associated collar,
   (h) a movable coil of generally rectangular shape, said coil encircling the core,
   (i) a pair of pointers carried by the coil, each pointer cooperating with one of the scales, (j) two pairs of spring wires passing through holes formed in the casting compound, each such pair being spaced from opposite sides of the core, (k) a first pair of parallel, tensioned wires spaced from an end of the core and secured to corresponding first ends of the spring wires, (l) a second pair of parallel, tensioned wires spaced from the other end of the core and secured to corresponding other ends of the spring wires, and (m) a pair of transverse wires secured to the movable coil and extending through the hole formed in the core, said wires having ends secured to the mid-points of corresponding ones of the said tensioned wires.

7. The invention as recited in claim 6, wherein the said means mounting the core comprises tapered hole portions formed in the surface of said core; matching tapered hole portions formed in the casting compound and in spaced alignment with the hole portions of the core; and non-magnetic tapered pins force-fitted into the aligned hole portions.

References Cited

UNITED STATES PATENTS

| | | | |
|---|---|---|---|
| 2,509,485 | 5/1950 | Dalzell | 324—115 |
| 2,677,105 | 4/1954 | Heiland | 324—154 |
| 2,695,521 | 11/1954 | Nazarenko | 324—106 X |
| 2,833,989 | 5/1958 | Nylander | 324—151 X |
| 3,012,196 | 12/1961 | Greibach | 324—106 X |

FOREIGN PATENTS 1,064,625  9/1959  Germany.

RUDOLPH V. ROLINEC, Primary Examiner

ALFRED E. SMITH, Assistant Examiner

U.S. Cl. X.R.

324—147, 151; 335—222

UNITED STATES PATENT OFFICE
CERTIFICATE OF CORRECTION

Patent No. 3,465,014     Dated September 2, 1969

Inventor(s) Frank J. Pavlik

It is certified that error appears in the above-identified patent and that said Letters Patent are hereby corrected as shown below:

Column 7, Sample 2, under heading "Compound" the formula should read

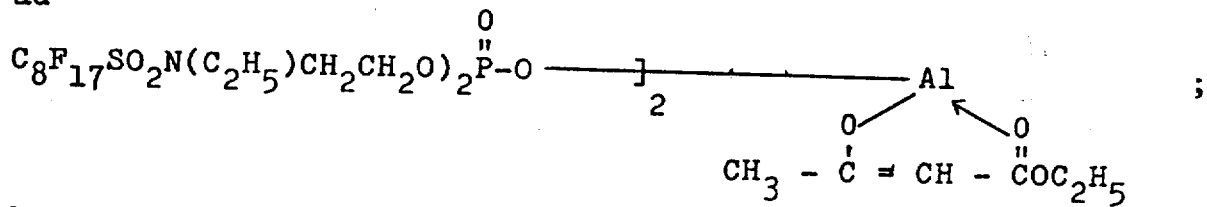

Column 7, Sample 3, under heading "Compound" the formula should read

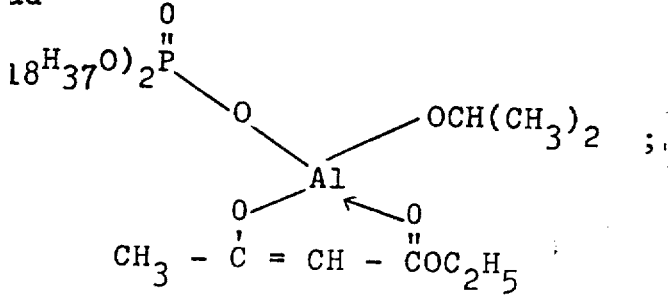

Column 7, approximately lines 57-60 the formula should read

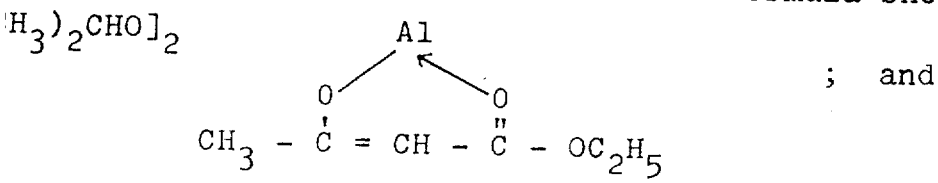     ; and

Column 8, line 62 "metal compuond is" should read "metal is".

SIGNED AND SEALED
APR 28 1970

(SEAL)
Attest:

Edward M. Fletcher, Jr.
Attesting Officer

Commissioner of Patents